United States Patent
Yoshida et al.

(10) Patent No.: US 7,226,142 B2
(45) Date of Patent: Jun. 5, 2007

(54) IMAGE COMMUNICATION APPARATUS, COMMUNICATION CONTROL METHOD AND IMAGE COMMUNICATION METHOD

(75) Inventors: Takehiro Yoshida, Tokyo (JP); Hisao Terajima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 619 days.

(21) Appl. No.: 10/760,286

(22) Filed: Jan. 21, 2004

(65) Prior Publication Data

US 2004/0169875 A1 Sep. 2, 2004

(30) Foreign Application Priority Data

Jan. 22, 2003 (JP) ............................. 2003-013739
Jan. 23, 2003 (JP) ............................. 2003-015229

(51) Int. Cl.
*B41J 29/38* (2006.01)
(52) U.S. Cl. .......................................... 347/14; 347/19
(58) Field of Classification Search ..................... None
See application file for complete search history.

(56) References Cited

U.S. PATENT DOCUMENTS

| 5,696,598 | A | 12/1997 | Yoshida et al. |
|---|---|---|---|
| 5,726,777 | A | 3/1998 | Yoshida et al. |
| 6,533,390 | B1 * | 3/2003 | Silverbrook ................ 347/42 |
| 6,654,138 | B1 | 11/2003 | Yoshida |
| 7,106,475 | B1 * | 9/2006 | Tajima et al. ............... 358/1.9 |
| 2001/0015822 | A1 | 8/2001 | Yoshida |
| 2003/0142329 | A1 | 7/2003 | Yoshida |

* cited by examiner

*Primary Examiner*—Thinh Nguyen
(74) *Attorney, Agent, or Firm*—Fitzpatrick, Cella, Harper & Scinto

(57) ABSTRACT

An image communication apparatus, if encoded image information is received, controls the form in which the received image information is printed, in dependence upon whether a specific type of printing paper has been loaded, or in dependence upon whether color-space information of the received image information matches a prescribed color space.

20 Claims, 17 Drawing Sheets

FIG. 2

| FIF | DIS/DTC SIGNAL | DCS SIGNAL |
|---|---|---|
| 68 | INDICATES WHETHER OR NOT FUNCTION FOR RECEIVING JPEG-ENCODED INFORMATION IN Lab COLOR SPACE IS AVAILABLE | SPECIFIES JPEG TRANSMISSION IN Lab COLOR SPACE |
| 69 | INDICATES WHETHER OR NOT FUNCTION FOR RECEIVING FULL-COLOR INFORMATION IN Lab COLOR SPACE IS AVAILABLE | SPECIFIES JPEG TRANSMISSION IN Lab COLOR SPACE |
| X | INDICATES WHETHER OR NOT FUNCTION FOR RECEIVING JPEG-ENCODED INFORMATION IN sYCC COLOR SPACE IS AVAILABLE | SPECIFIES JPEG TRANSMISSION IN sYCC COLOR SPACE |

FIG. 3

| TYPE OF PRINTING PAPER IN CASSETTE 1 | PLAIN PAPER |
| --- | --- |
| TYPE OF PRINTING PAPER IN CASSETTE 2 | PHOTOGRAPHIC PAPER |

IMAGE COMMUNICATION APPARATUS, COMMUNICATION CONTROL METHOD AND IMAGE COMMUNICATION METHOD

FIELD OF THE INVENTION

This invention relates to a technique for sending and receiving color image information.

BACKGROUND OF THE INVENTION

Conventional facsimile machines capable of communicating color image information send and receive color image information in Lab color space, which has been determined by ITU-T Recommendations T.30, T.4, T.81 and T.42. With conventional color facsimile machines of this kind, no particular problems arise because they have been used to send and receive color documents. In recent years, however, digital still cameras have become quite popular and there is now increasing demand for the ability to transmit color image information, which has been captured by such a digital still camera, using the facsimile communication protocol as is. However, the color space of color image information used in such a digital still camera is sYCC color space and not Lab color space. In addition, digital cameras employ JPEG encoding as the method of encoding color images. In order to transmit an image captured by a digital camera, therefore, a protocol for transmitting JPEG code in sYCC color space as is has been studied.

In a case where image information captured by a digital still camera is transmitted, consideration has been given to the transmission, as is, of image files that have been stored on a memory card of the camera. For example, consider JPEG full-color transmission in sYCC color space. Basically, the object of transmission in this case often is not color document information but file information concerning images captured by a digital still camera and stored on a Compact Flash (registered trademark) card. Accordingly, for color document information, transmission in Lab color space has been considered. On the other hand, for file information acquired by a digital still camera or the like and stored on a Compact Flash (registered trademark) card, transmission in sYCC color space has been considered.

Accordingly, in a case where a JPEG-encoded file in sYCC color space has been received by an apparatus on the receiving side, no problems arise in regard to storing this file information on a Compact Flash (registered trademark) card. However, when an attempt is made to print the image on a print medium, it is necessary to decode the image file first and then print the image.

If in this case only the number of pixels in the JPEG-encoded file, and not the resolution and print size of the image, is specified by the apparatus on the transmitting side, how printing should actually be performed will be indefinite. Accordingly, the facsimile machine on the transmitting side transmits the resolution at which photography was performed by the digital still camera, without setting a resolution such as 200 dpi, unlike the case where ordinary color image data is transmitted. Consequently, when the facsimile machine that has received this image file decodes the image file and prints the decoded image on plain paper, a high-quality image will not be obtained.

SUMMARY OF THE INVENTION

Accordingly, an object of the present invention is to provide an image communication apparatus in which, when encoded image information has been received, controls the form of printing of the received image information in dependence upon whether or not printing paper of a specific paper type has been loaded in the apparatus.

Another object of the present invention is to provide an image communication apparatus in which, when encoded image information has been received, controls the form of printing of the received image information in dependence upon whether or not the color-space information of the received image information matches a prescribed color space.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a diagram illustrating a specific example of FIF information of DIS/DTC and DCS signals used in the facsimile machine of this embodiment of the invention;

FIG. 3 is a diagram illustrating an example of the data structure of a paper-type memory in a facsimile machine according to a first embodiment of the present invention;

DESCRIPTION OF THE PREFERRED EMBODIMENTS

Preferred embodiments of the present invention will now be described in detail in accordance with the accompanying drawings.

First Embodiment

Figure 1:
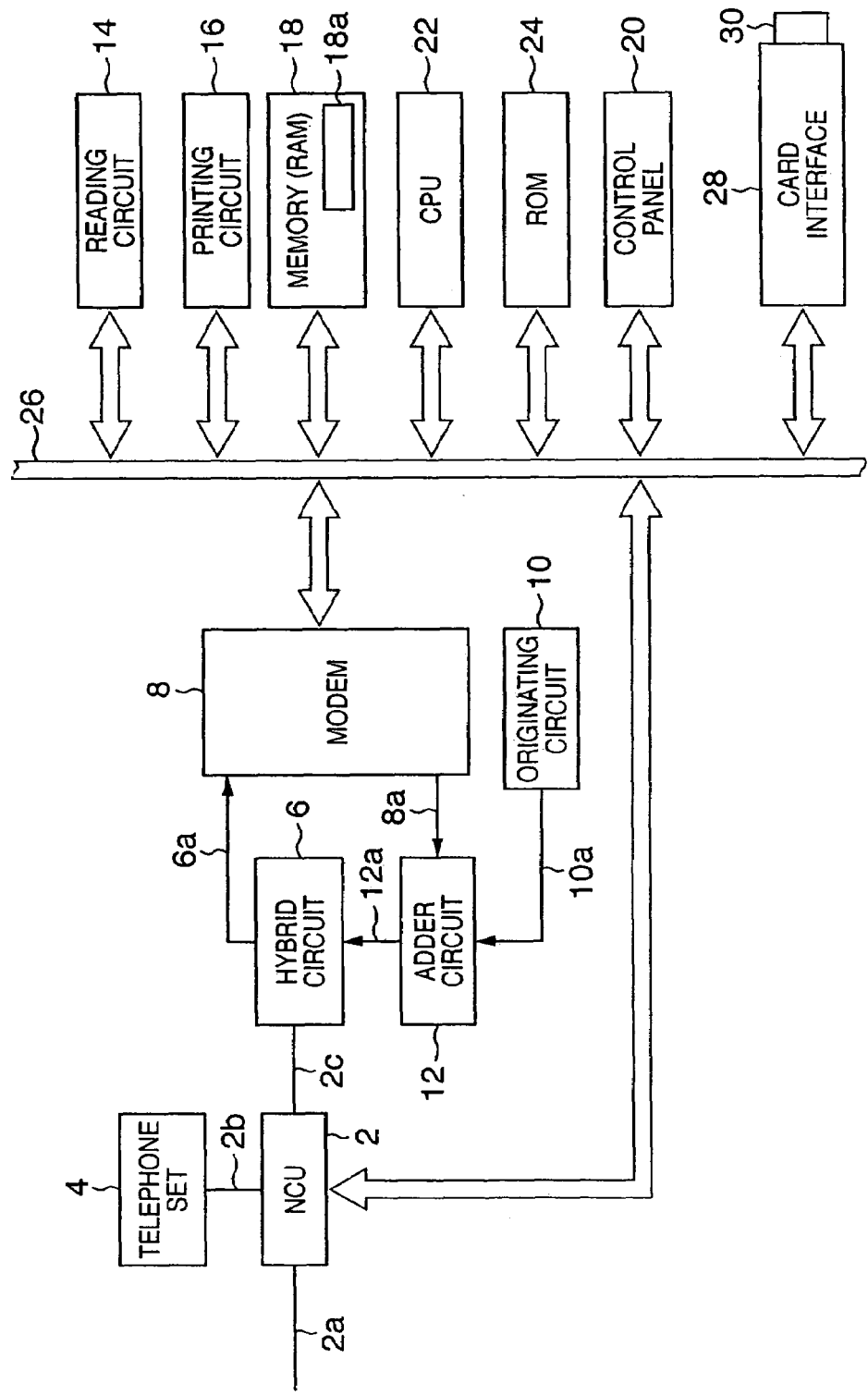
FIG. 1 is a functional block diagram illustrating the structure of a facsimile machine embodying the present invention.

As shown in FIG. 1, an NCU (network control unit) 2 effects a connection to another terminal via a telephone line 2a in order to use the telephone line 2a in data communication or the like, and controls the connection of a telephone switching network. Further, the NCU 2 effects a changeover to a data communication line and maintains a loop. Furthermore, in response to control by a CPU 22 via a bus 26, the NCU 2 connects the telephone line 2a to the side of a telephone set 4 (turns CML off) or connects the telephone line 2a to the side of a facsimile apparatus (hybrid circuit 6) (turns CML on). It should be noted that the telephone line 2a is connected to the side of a telephone set 4 (2b) under ordinary circumstances.

The hybrid circuit 6 separates signals into a transmit signal and receive signal, sends a transmit signal from an adder circuit 12 to the telephone line 2a via the NCU 2, receives a signal from the side of the communicating party via the NCU 2 and sends the signal to a modem 8 via a signal line 6a. The modem 8 is capable of performing modulation and demodulation that is based upon ITU-T Recommendations V.8, V.21, V.27ter, V.29, V.17 and V.34. Each transmission mode of the modem 8 is specified by control exercised by the CPU 22 via bus 26. A transmit signal is input to the modem 8 via the bus 26, and the modem 8 outputs modulated data to a signal line 8a.

On the other hand, a receive signal that enters the modem 8 via the signal line 6a is demodulated and output to the bus 26 by the modem 8. An originating circuit 10 accepts input of telephone-number information via the bus 26 and outputs a DTMF select signal to a signal line 10a. The information on signal line 8a and the information on signal line 10a is input to the adder circuit 12, which proceeds to add this information and output the result to a signal line 12a.

A reading circuit 14, which is capable of reading a color image, outputs the read color image data to the bus 26. A printing circuit 16, which is capable of printing a color image, has print information input thereto via the bus 26 and performs printing line by line in succession in accordance with the print information. A memory (RAM) 18 is a working memory. The memory 18 is used to store the raw information of the image data read by the reading circuit 14 or information that is the result of encoding this image information, and to store receive information received via the bus telephone line 2a, and information that is the result of decoding this information, via the bus 26.

The memory 18 has a paper-type memory 18a. The types of printing paper that have been placed in paper cassettes that accommodate the printing paper of the printing circuit 16 can be registered in the paper-type memory 18a, as shown in FIG. 3. In this embodiment, types of printing paper have been stored in association with a paper cassette 1 and a paper cassette 2. A control panel 20 includes keys for single-button dialing, keys for abbreviated dialing, numeric keys, a * key, a # key, a start key, a stop key, a set key, a key for selecting reading of color information, a key for selecting transmission of file information, a select key for transferring a received file to a card, and function keys. Key information obtained by operating the control panel 20 is output via the bus 26.

The control panel 20 further includes a display unit for displaying information that enters via the bus 26. A CPU (central processing unit) 22 performs overall control of the facsimile apparatus according to this embodiment and executes a facsimile-transmission control procedure. The control program of the CPU 22 has been stored in a ROM 24. A card interface 28 is adapted to accommodate an inserted card 30 [e.g., a Compact Flash (registered trademark) on which information captured by a digital camera has been stored].

FIG. 2 is a diagram useful in describing color-related bit information and information added anew to ITU-T Recommendation T.30 in this embodiment.

(1) Whether a JPEG-receive function in Lab color space is available is reported by bit 68 of the FIF (Facsimile Information Field) in a DIS (Digital Information Signal)/DTC (Digital Transmit Command). Further, JPEG transmission in Lab color space is specified by bit 68 of the FIF in a DCS (Digital Command Signal).

(2) Whether a function for receiving full-color information in Lab color space is available is reported by bit 69 of the FIF in the DIS/DTC signal. Further, full-color image transmission in Lab color space is specified by bit 69 of the FIF in the DCS.

(3) Whether a function for receiving JPEG code in sYCC color space is available is reported by bit X of the FIF in the DIS/DTC signal. Further, transmission by JPEG code in sYCC color space is specified by bit X of the FIF in the DCS.

With the color facsimile apparatus according to this embodiment, the receiving machine notifies the transmitting machine of the following by a preliminary procedure: whether or not the receiving machine has the function for receiving JPEG-encoded information in Lab color space; whether or not the receiving machine has the function for receiving full-color information in Lab color space; or whether or not the receiving machine has the function for receiving JPEG-encoded information in SYCC color space. On the other hand, the transmitting machine designates the following with respect to the receiving machine: transmission of JPEG-encoded information in Lab color space; transmission of full-color information in Lab color space; or transmission of JPEG-encoded information in sYCC color space. Furthermore, the transmitting machine sets the type of printing paper with regard to the receiving machine.

In a case where transmission of JPEG code has been specified from the transmitting machine, whether received information sent from the transmitting machine is to be printed is decided in accordance with whether paper of a specific type has been loaded in the receiving machine. More specifically, assume that transmission of JPEG code has been specified from the transmitting machine. If a specific type of printing paper has been loaded in the receiving machine, then printing of the received information is executed. If a specific type of printing paper has not been loaded in the receiving machine, on the other hand, then printing of the received information is not executed.

More specifically, in a case where the transmitting machine has specified transmission of JPEG code in sYCC color space, the receiving machine decides whether or not to print the received information in dependence upon whether a specific type of printing paper has been loaded in the machine. That is, if printing paper of a specific type has been loaded in the receiving machine, the receiving machine prints the received information. If printing paper of a specific type has not been loaded in the receiving machine, then the receiving machine stores the received information on a memory card or in the memory of the receiving machine without printing the received information. Here photographic paper or the like on which high-quality color images can be printed is the specific type of paper.

FIGS. 4 to 11 are flowcharts illustrating processing executed by the facsimile apparatus according to this embodiment of the present invention. The program for executing this processing has been stored in the ROM 24 and is executed under the control of the CPU 22.

First, the content of the memory 18 is initialized at step S1 via the bus 26. Here the type of printing paper being accommodated in the paper cassette 1 and in the paper cassette 2 of the printing circuit 16 is stored in the paper-type memory 18a as "plain paper" in both cases. Next, control proceeds to step S2, at which the display unit of the control panel 20 is cleared via the bus 26, and then to step S3, at which the CML of NCU 2 is turned off via bus 26. Next, control proceeds to step S4, at which the facsimile apparatus determines whether reception has been selected. Control proceeds to step S5 when reception has been selected. When reception has not been selected, control proceeds to step S7, at which other processing that has been selected or designated is executed.

Control proceeds from step S7 to step S8, at which it is determined whether a designation to register types of printing paper has been selected in association with the paper cassettes of the printing circuit 16. If an instruction to perform registration is entered, control proceeds to step S9. Here the types of printing paper are registered in the paper-type memory 18a via the bus 26 in association with the paper cassette 1 and paper cassette 2 in the manner shown in, e.g., FIG. 3. When it is determined at step S8 that registration has not been designated, and also when step S9 has been executed, control proceeds to step S70 in FIG. 11.

FIG. 3 is a diagram illustrating an example of data in the paper-type memory 18a. Here the fact that "PLAIN PAPER" has been loaded in paper cassette 1 of printing circuit 16 and "PHOTOGRAPHIC PAPER" in paper cassette 2 has been registered.

It should be noted that the determination of paper type may be made by having the operator enter the type using the control panel 20. Alternatively, each paper cassette may be provided with a paper-type sensor and the type information may be registered in the memory 18a based upon results of discrimination from the paper-type sensors.

When reception has been selected at step S4, control proceeds to step S5, where the CML of the NCU 2 is turned on via the bus 26, and then to step S6, where the bits 68, 69 and X of the FIF in the DIS are made "1" in a preliminary procedure.

Next, control proceeds to step S10 (FIG. 5), where it is determined whether the X bit of the FIF in the DIS is "1". Control proceeds to step S11 if bit X is "1". Here the information in the paper-type memory 18a is read via the bus 26 and it is determined whether "PHOTOGRAPHIC PAPER" has been loaded in a paper cassette of the printing circuit 16. When such paper has been loaded, control proceeds to step S12, at which the paper cassette in which photographic paper has been loaded is selected, received JPEG code data in sYCC color space is decoded and expanded into image data and the image is printed on the photographic paper in a photographic mode. Control then proceeds to step S13, at which a post-procedure is executed before control returns to step S3.

On the other hand, when it is found at step S11 that a paper cassette in which photographic paper has been loaded is not present in the printing circuit 16, control proceeds to step S14, at which it is determined whether the memory card 30 has been inserted and is capable of receiving a facsimile image. If the memory card 30 can receive the image, control proceeds to step S15, at which the facsimile image is received and the received JPEG code data in sYCC color space is stored on the memory card 30. Control then proceeds to step S16, at which a post-procedure is executed before control returns to step S3.

If it is found at step S14 that the memory card 30 has not been inserted, control proceeds to step 20 (FIG. 6), where it is determined whether the memory 18 has enough storage capacity to store the received image. If the image can be stored in the memory 18, control proceeds to step S21, where the received JPEG code data in sYCC control space is stored in the memory 18. Control then proceeds to step S22, at which a post-procedure is executed before control returns to step S3.

If it is found at step S20 that the memory 18 does not have enough storage capacity to store the received image, control proceeds to step S23. Here a message "THE MEMORY IS FULL. PRINT THE RECEIVED INFORMATION." is displayed on the display unit of the control panel 20 to alert the operator. Control then returns to step S3. It should be noted that this display can be erased by operating a key such as a clear key on the control panel 20.

If it is found at step S10 (FIG. 5) that the X bit of the FIF in the DIS is not "1", control proceeds to step S30 (FIG. 7), where it is determined whether bit 68 or 69 of the FIF in the DIS is "1". If the decision rendered is "YES", control proceeds to step S31, at which reference is had to the paper-type memory 18a to determine whether plain paper has been loaded in a paper cassette of the printing circuit 16. If plain paper has been loaded, control proceeds to step S32. Here received JPEG code data in Lab color space is decoded, expanded into image data and printed on the printing paper in full color. Control then proceeds to step S33, at which a post-procedure is executed before control returns to step S3.

If it is found at step S31 that plain paper has not been loaded, control proceeds to step S34, at which it is determined whether photographic paper has been loaded in a paper cassette of the printing circuit 16. If photographic paper has been loaded, control proceeds to step S35. Here received JPEG code data in Lab color space is decoded, expanded into image data and printed on the printing paper in full color. Control then proceeds to step S36, at which a post-procedure is executed before control returns to step S3.

If it is determined at step S34 that photographic paper has not been loaded in a paper cassette of the printing circuit 16, control proceeds to step S40 (FIG. 8), where it is determined whether the data can be received and stored in the memory 18. If the image data can be stored, control proceeds to step S41, where the received JPEG code data in Lab color space is stored in the memory 18. Control then proceeds to step S42, at which a post-procedure is executed before control returns to step S3.

Figure 7:
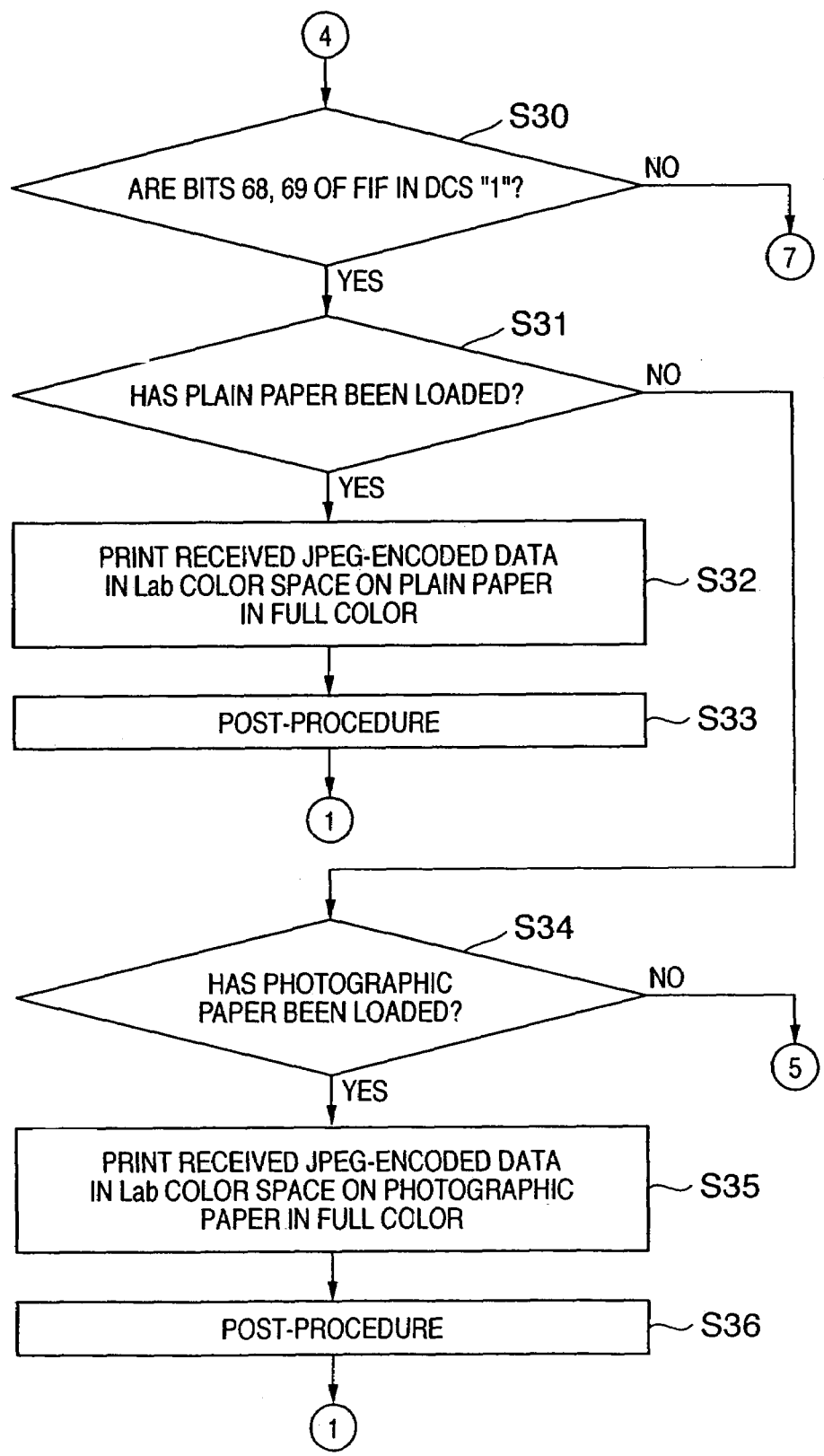
FIG. 7 is a flowchart for describing the flow of control in the image communication apparatus according to the first embodiment of the invention.
Figure 8:
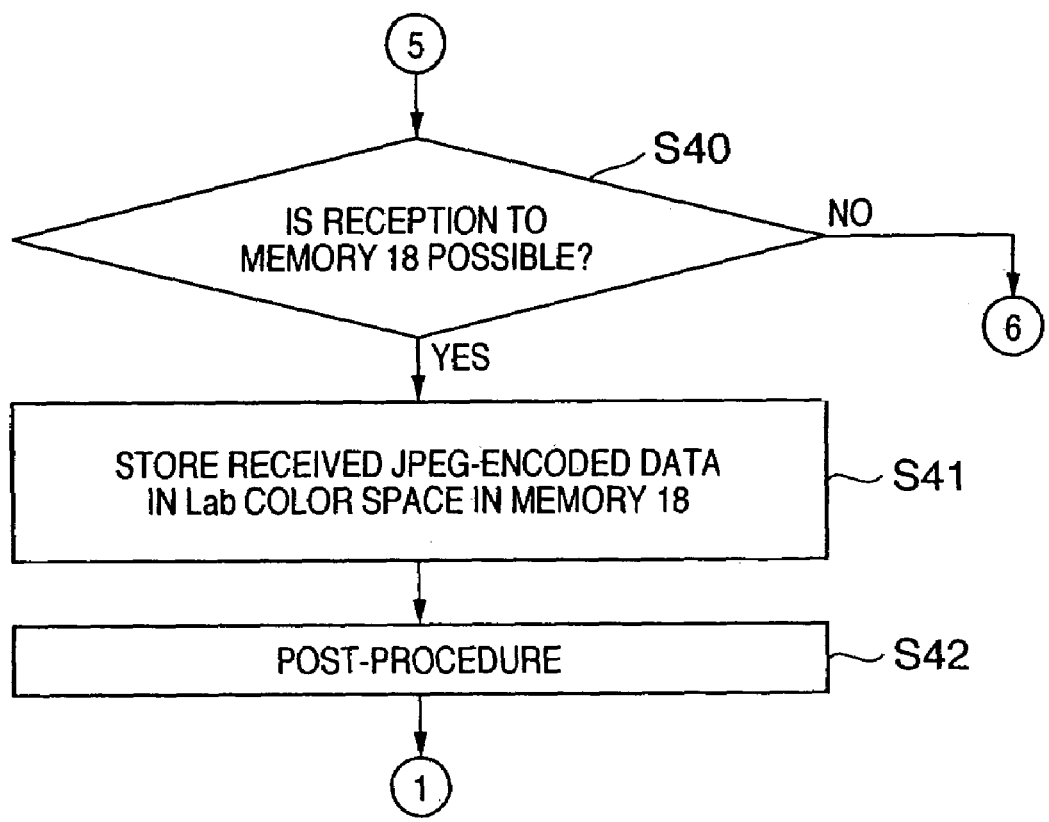
FIG. 8 is a flowchart for describing the flow of control in the image communication apparatus according to the first embodiment of the invention.
Figure 9:
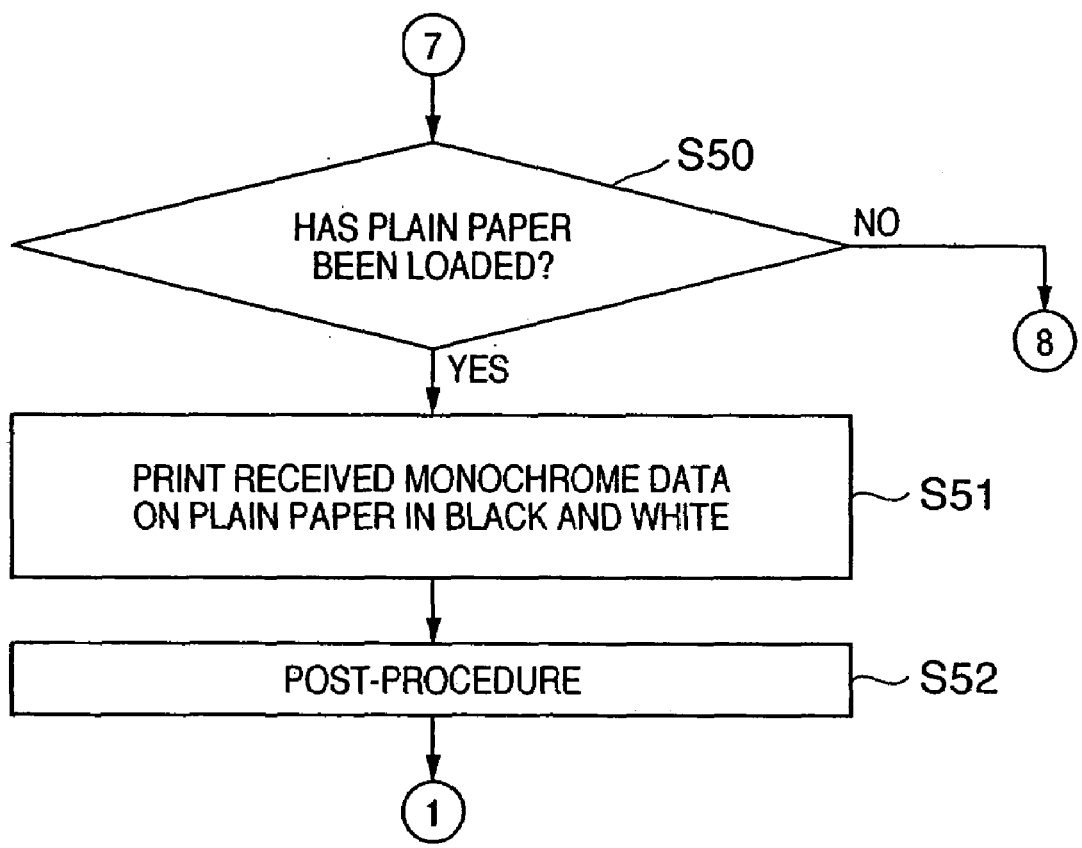
FIG. 9 is a flowchart for describing the flow of control in the image communication apparatus according to the first embodiment of the invention.
Figure 10:
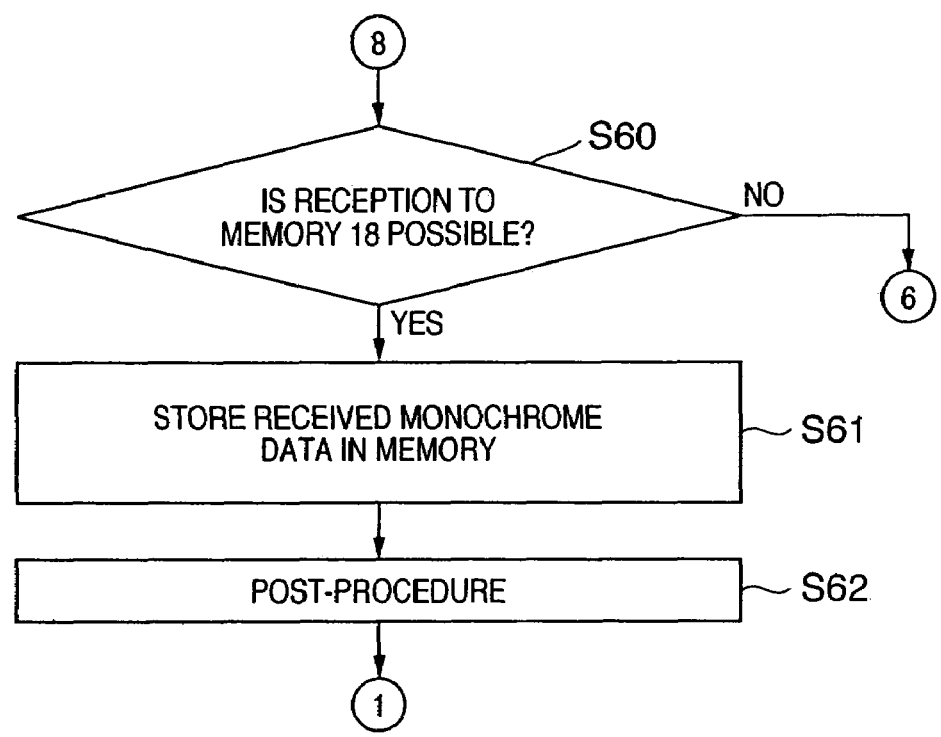
FIG. 10 is a flowchart for describing the flow of control in the image communication apparatus according to the first embodiment of the invention.
Figure 11:
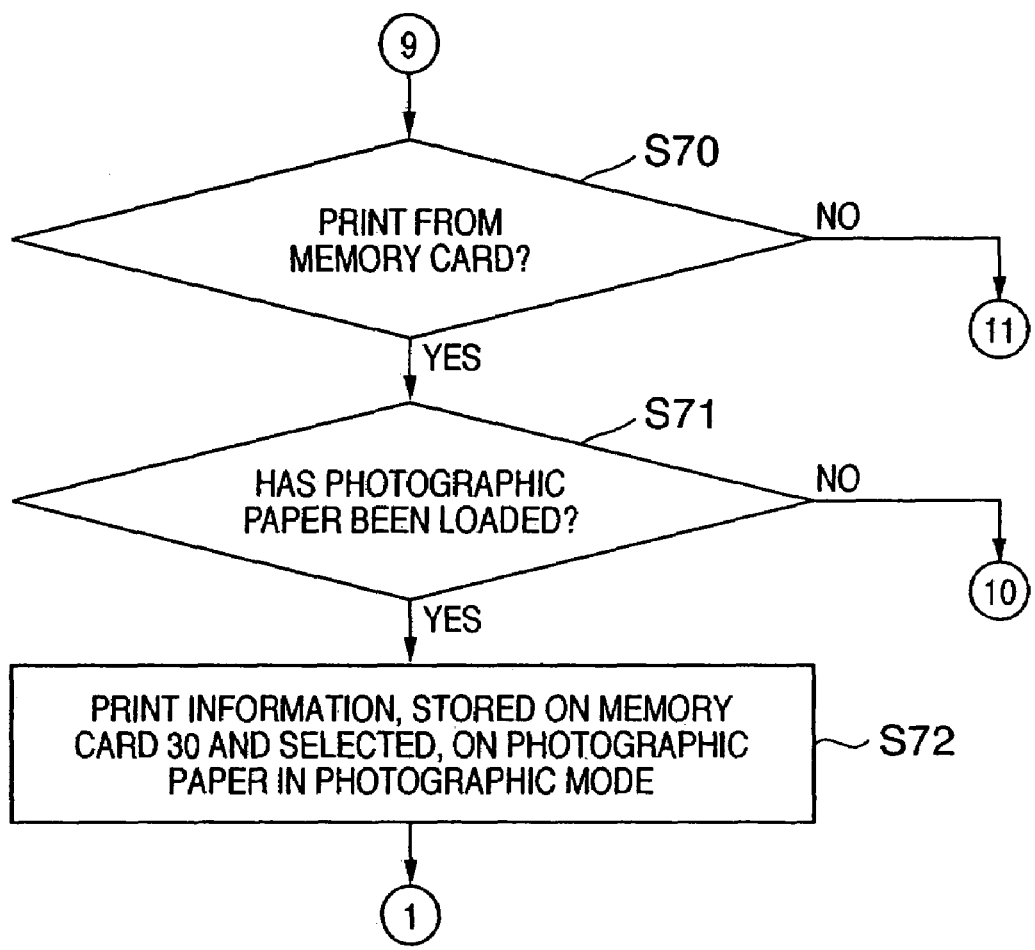
FIG. 11 is a flowchart for describing the flow of control in the image communication apparatus according to the first embodiment of the invention.

If it is found at step S30 in FIG. 7 that bit 68 or 69 of the FIF in the DCS signal is not "1" (i.e., in case of a monochrome image), control proceeds to step S50 (step 9), at which it is determined whether plain paper has been loaded in a paper cassette of the printing circuit 16. If plain paper has been loaded, control proceeds to step S51, where the received monochrome data is printed on plain paper in black and white. Control then proceeds to step S52, at which a post-procedure is executed before control returns to step S3.

If it is found at step S50 that plain paper has not been loaded in a paper cassette of the printing circuit 16, control proceeds to step S60 (FIG. 10), where it is determined whether the received image data is capable of being stored in the memory 18. If storage is possible, control proceeds to step S61, where the received monochrome data is stored in the memory 18. Control then proceeds to step S62, at which a post-procedure is executed before control returns to step S3.

Figure 4:
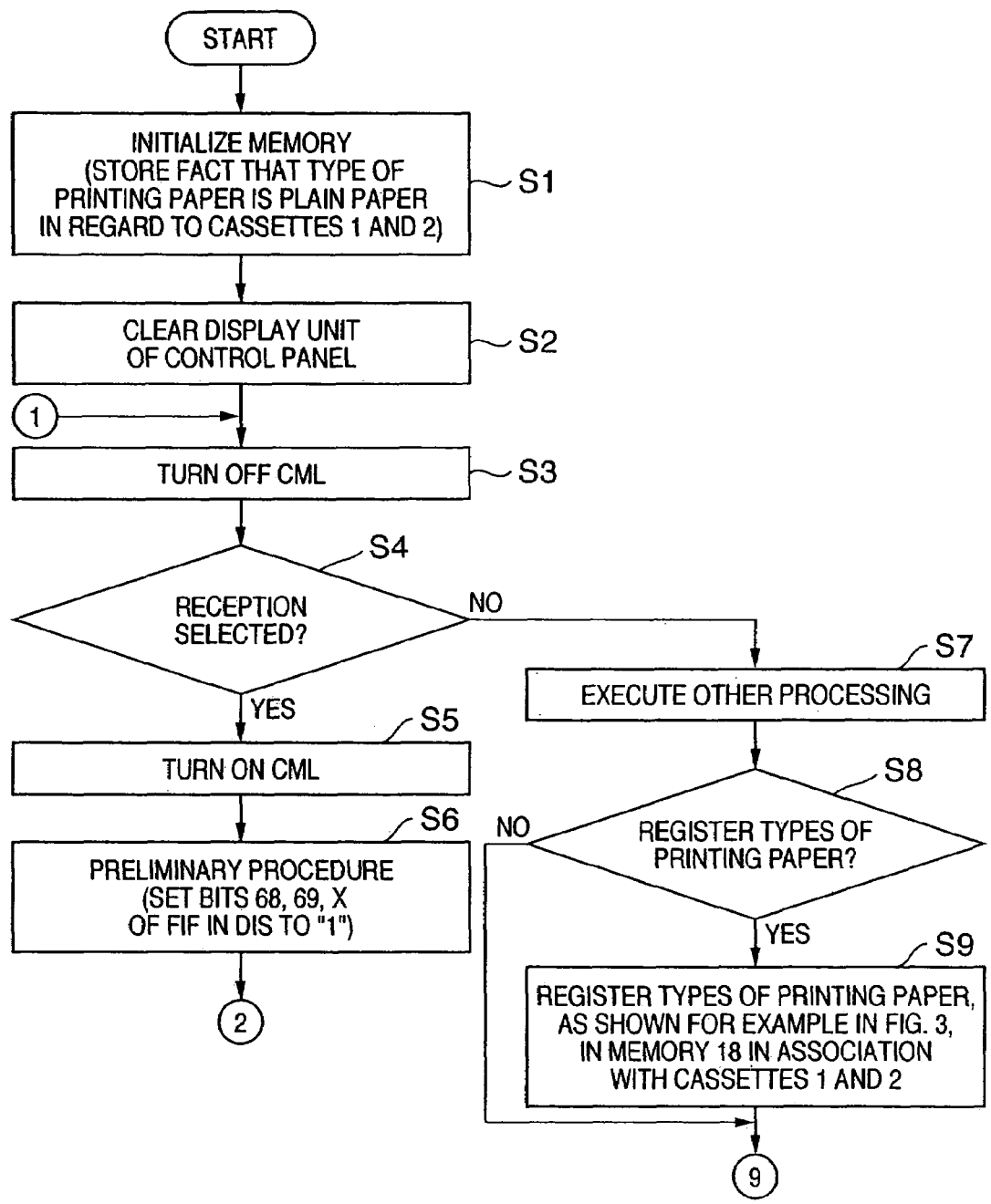
FIG. 4 is a flowchart for describing the flow of control in an image communication apparatus according to the first embodiment of the invention.
Figure 5:
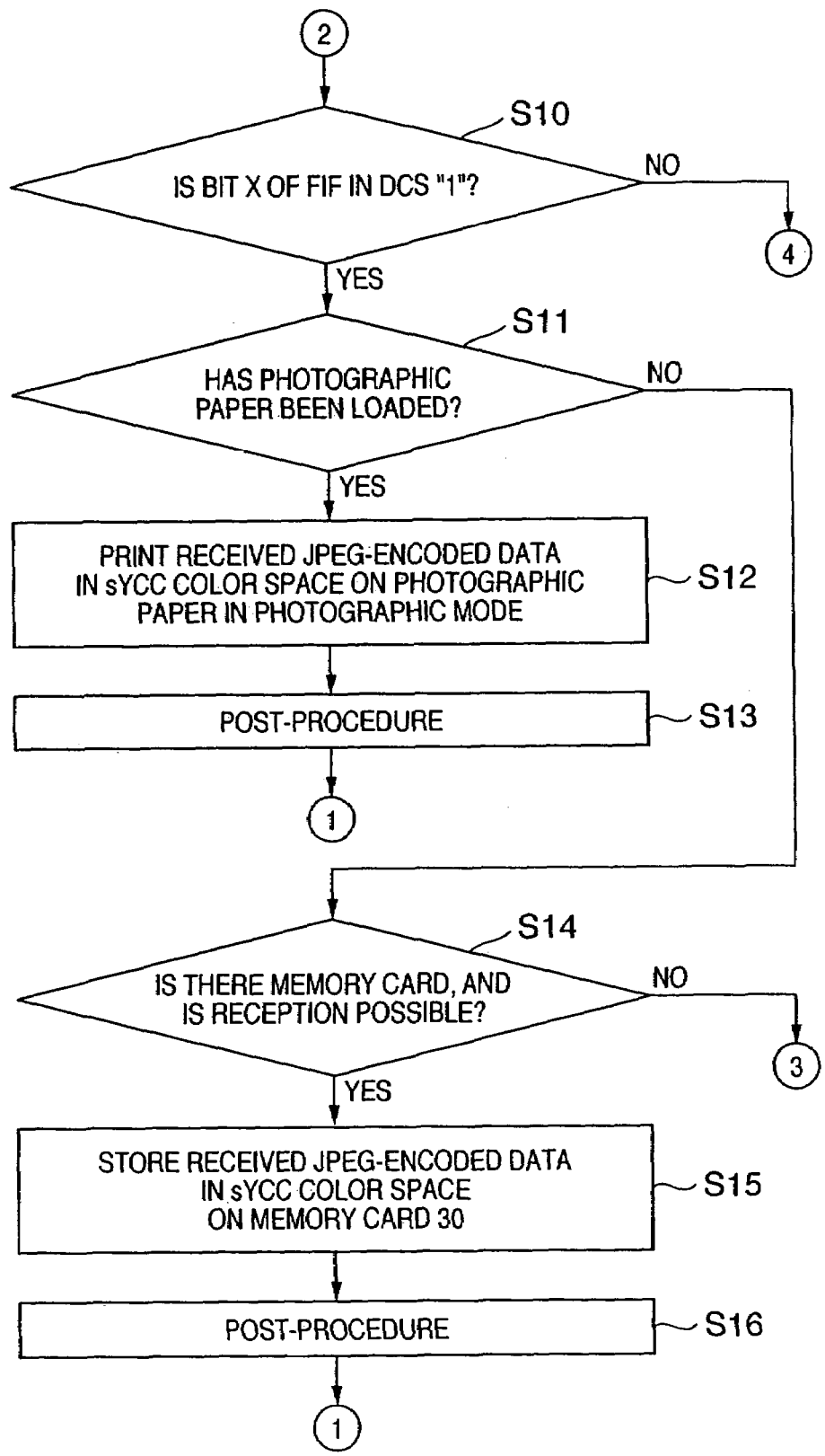
FIG. 5 is a flowchart for describing the flow of control in the image communication apparatus according to the first embodiment of the invention.
Figure 6:
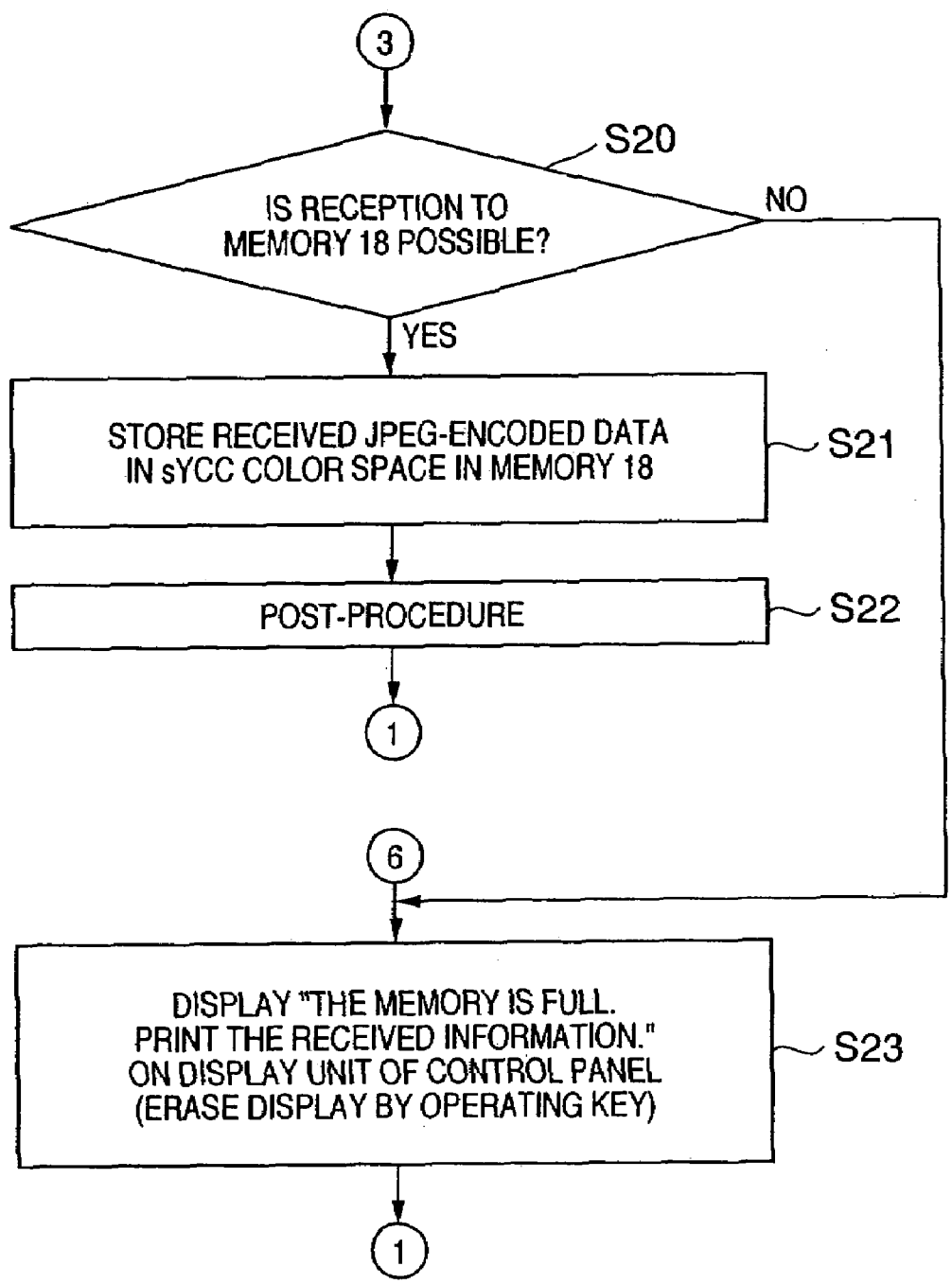
FIG. 6 is a flowchart for describing the flow of control in the image communication apparatus according to the first embodiment of the invention.

If a "NO" decision has been rendered at step S8 in FIG. 4, or after step S9 has been executed, control proceeds to step S70 (FIG. 11), where it is determined whether printing of image information that has been stored on the memory card 30 has been selected by entry of information from the control panel 20 operated by the operator. If printing of the image information from the memory card 30 is specified, control proceeds to step S71, at which it is determined whether photographic paper has been loaded in a paper cassette of the printing circuit 16. If photographic paper has been loaded in the paper cassette, control proceeds to step S72, at which the image information stored on the memory card 30 and selected is printed on the photographic paper in the photographic mode.

Figure 12A:
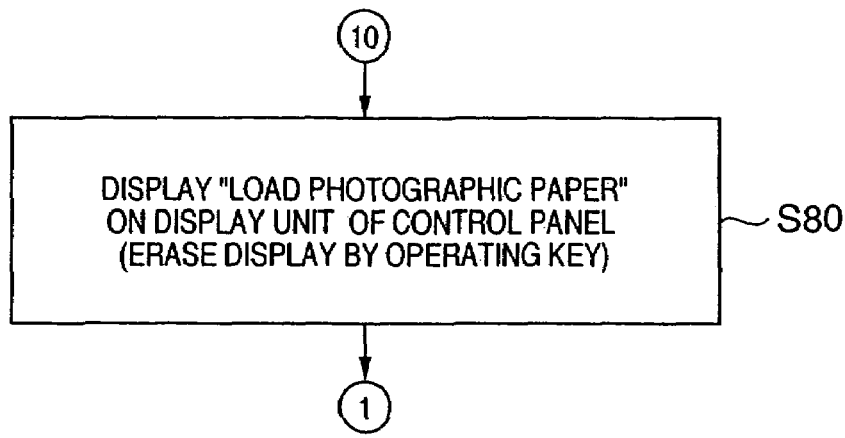
FIGS. 12A and 12B are flowcharts for describing the flow of control in the image communication apparatus according to the first embodiment of the invention.

If it is found at step S71 that photographic paper has not been loaded in the printing circuit 16, control proceeds to step S80 (FIG. 12A). Here a message "LOAD PHOTOGRAPHIC PAPER" is displayed on the display unit of the control panel 20 to prompt the operator to load photographic paper, after which control returns to step S3. It should be noted that this display is erased by operating a key on the control panel 20.

Figure 12B:
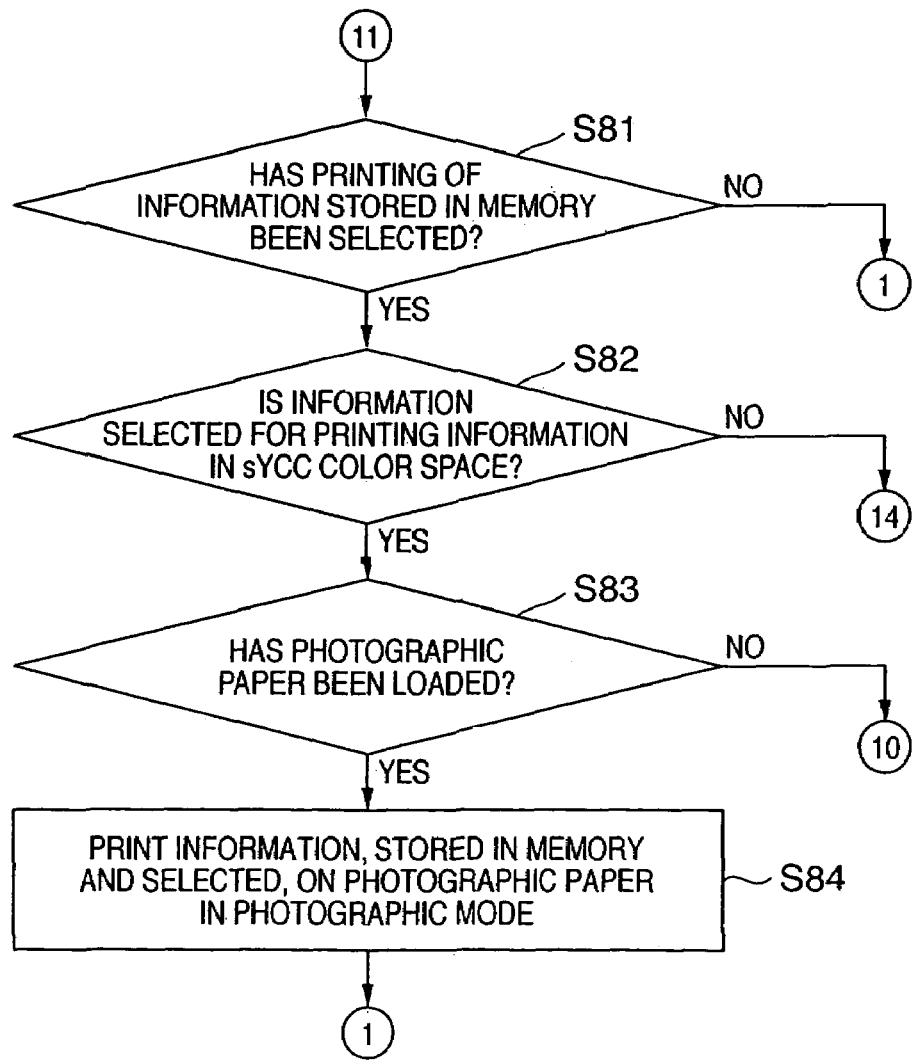

If it is decided at step S70 that the content of the memory card 30 is not to be printed, control proceeds to step S81 (FIG. 12B), at which it is determined based upon information entered from the control panel 20 whether printing of image information stored in memory 18 has been selected. If printing has been selected, control proceeds to step S82, at which it is determined whether the image information selected for printing is image information in sYCC color space. If the image information is in sYCC color space, then control proceeds to step S83, at which it is determined whether photographic paper has been loaded in the printing circuit 16. If photographic paper has been loaded, control proceeds to step S84, where the image information stored in memory 18 and selected is printed on the photographic paper in the photographic mode. Control then returns to step S3. It should be noted that when it is determined at step S81 that printing of image information stored in memory 18 has not been designated, control returns to step S3.

If it is determined at step S82 that image information selected for printing is not image information in sYCC color space, control proceeds to step S90 (FIG. 13), at which it is determined whether the color space of the image information selected for printing is Lab color space. If this is the case, control proceeds to step S91, at which it is determined whether plain paper has been loaded in the printing circuit 16. If plain paper has been loaded, control proceeds to step S92, at which the image information stored in memory 18 and selected is printed on the plain paper in full color. Control then returns to step S3.

If it is found at step S91 that plain paper has not been loaded in the printing circuit 16, then control proceeds to step S93, at which it is determined whether photographic-paper has been loaded in the printing circuit 16. If photographic paper has been loaded, control proceeds to step S94, at which the image information stored in memory 18 and selected is printed on the photographic paper in full color. Control then returns to step S3.

Figure 14A:
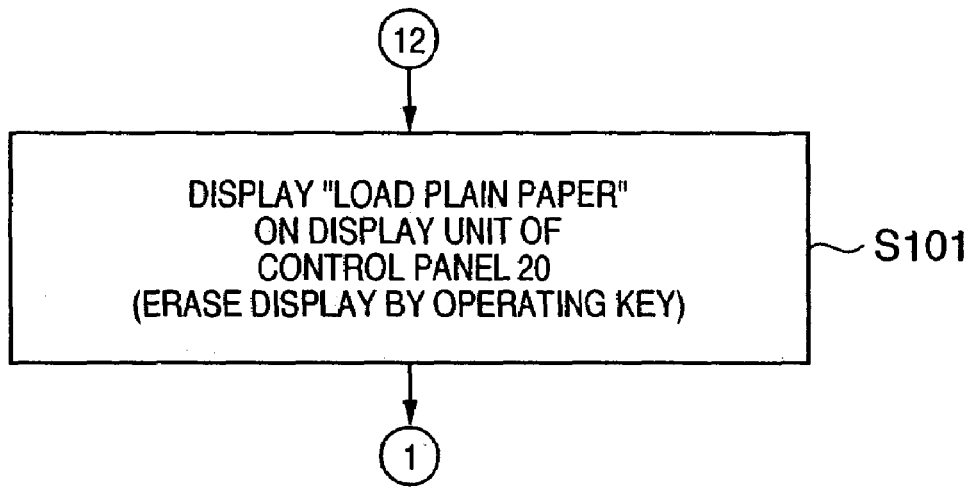
FIGS. 14A and 14B are flowcharts for describing the flow of control in the image communication apparatus according to the first embodiment of the invention.

On the other hand, if it is found at step S93 that photographic paper has not been loaded, control proceeds to step S101 (FIG. 14A), at which a message "LOAD PLAIN PAPER" is displayed on the display unit of the control panel 20 to prompt the operator to load plain paper. It should be noted that this display is erased by operating a key on the control panel 20. Control then returns to step S3.

Figure 13:
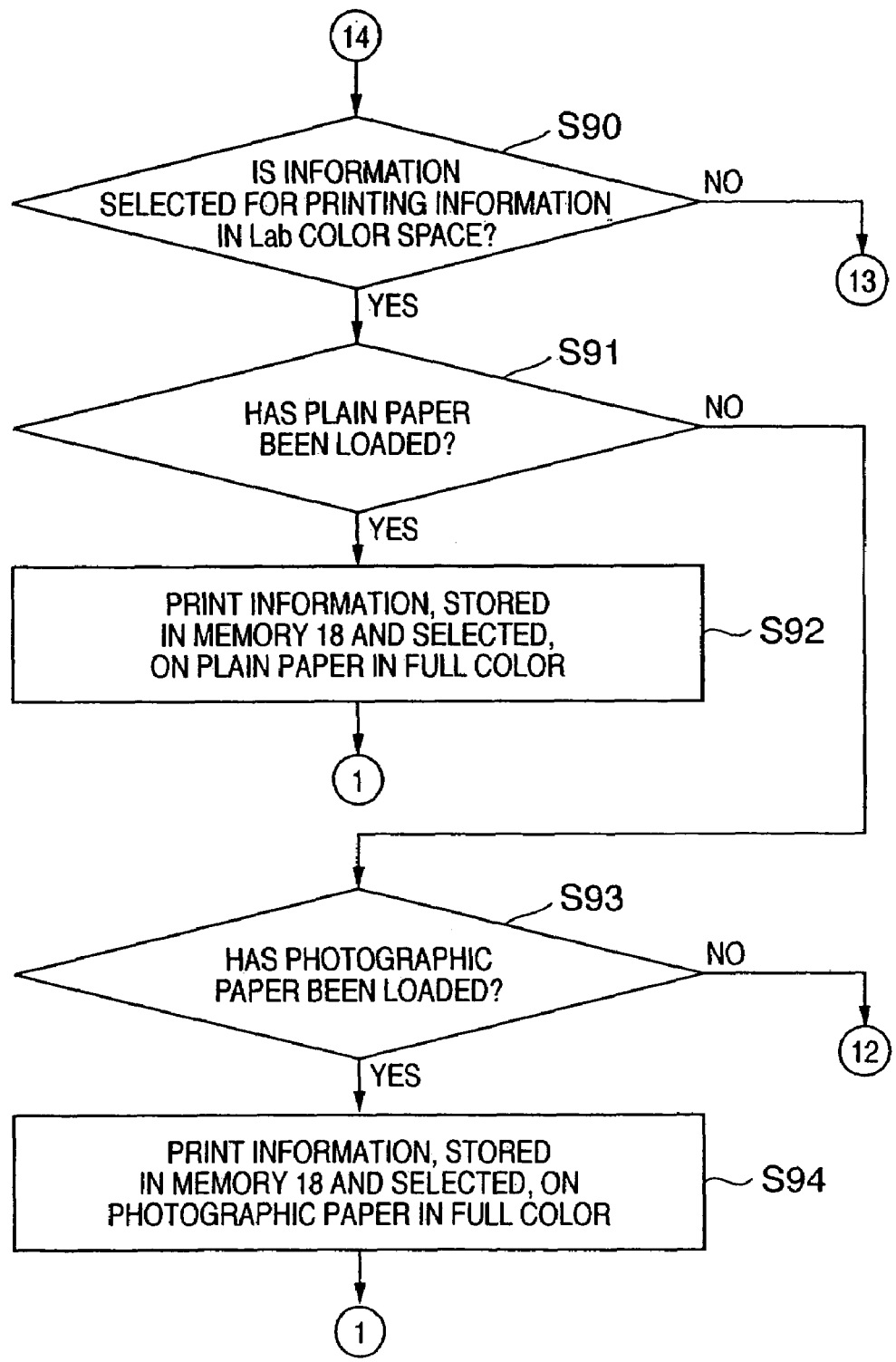
FIG. 13 is a flowchart for describing the flow of control in the image communication apparatus according to the first embodiment of the invention.
Figure 14B:
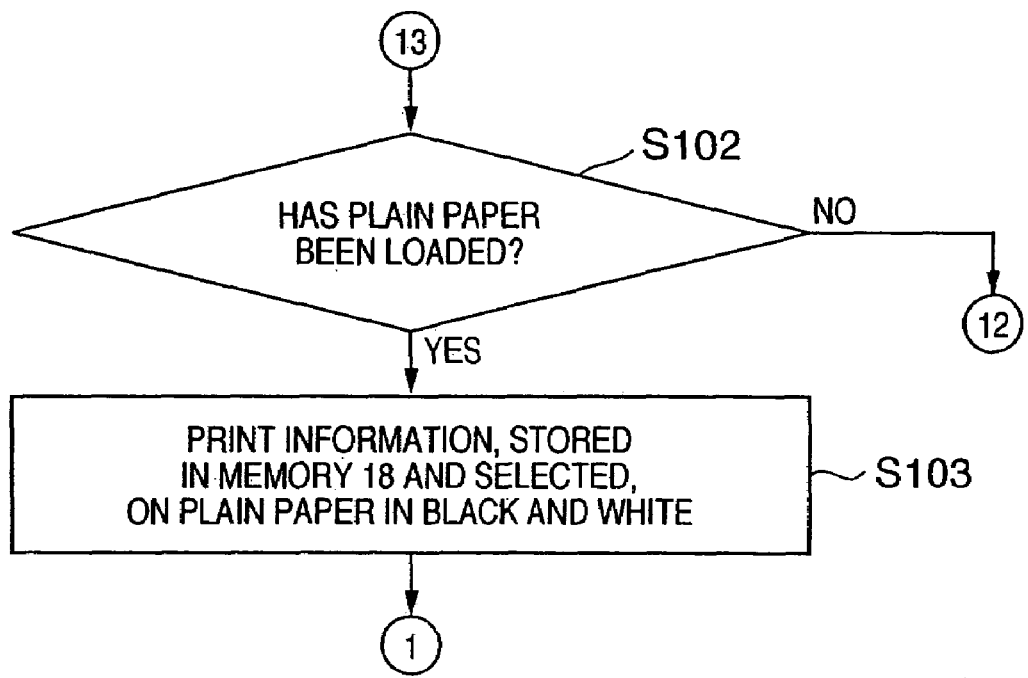

If it is determined at step S90 in FIG. 13 that the color space of the image information selected for printing is not Lab color space, control proceeds to step S102 (FIG. 14B), where it is determined whether plain paper has been loaded in the printing circuit 16. If plain paper has been loaded, then control proceeds to step S103, at which the image information stored in memory 18 and selected is printed on the plain paper in black and white. If it is found at step S102 that plain paper has not been loaded, then control proceeds to step S101.

Thus, it can be so arranged that when transmission of color image information has been selected, printing of the received information is executed by the receiving machine if printing paper of a specific type has been loaded in the receiving machine. If printing paper of a special type has not been loaded, on the other hand, then printing of the received information will not be executed. This makes it possible to realize printing with a high image quality.

Further, if high-quality printing cannot be performed, a high-quality image can be printed after printing paper of a special type has been loaded. This makes it possible to provide a facsimile apparatus that is very easy for the user to use.

Further, according to this embodiment, it can be so arranged that when transmission has been selected for color image information in sYCC color space that is most likely image information captured by a digital still camera and transmitted without being manipulated, printing of the received image is executed if printing paper of a specific type has been loaded in the receiving machine and, conversely, printing of the received image is not executed if printing paper of a specific type has not been loaded in the receiving machine. As a result, a high-quality image that has been captured by a digital camera can be printed at a high quality. Further, it can be so arranged that if a high-quality image cannot be printed, printing is performed on printing paper of a specific type after the paper of the specific type is loaded. This makes it possible to provide a facsimile apparatus that is very easy for the user to use.

Further, according to this embodiment, control can be exercised in such a manner that when transmission has been selected for color image information in sYCC color space that is most likely color image information or image information captured by a digital still camera and transmitted without being manipulated, printing of the received image is executed if printing paper of a specific type has been loaded in the receiving machine and printing of the received image is not executed if printing paper of a specific type has not been loaded in the receiving machine. Furthermore, when the desired paper has not been loaded, the image information can be stored on a memory card or in the memory of the facsimile apparatus proper. After the desired paper is loaded, the image data can be read out of the memory card or memory and printed on printing paper of a specific type.

Furthermore, an image file in sYCC color space can be transmitted as is and the image file can be received and processed by the receiving machine. In addition, the received image file can be uploaded as is to a Compact Flash (registered trademark) card. Since JPEG-format information can be transmitted by an image file in sYCC color space, it is possible to perform facsimile color communication that conforms to the apparatus on the receiving side.

Further, by merely adding on a single bit that indicates in a preliminary procedure whether or not a facsimile machine has a function for receiving in sYCC color space, notification of number of extension bits of a single item of pixel information and of subsampling can be implemented merely by adding on one bit to the FIF of DIS, DCS and DTC signals. This leaves the possibility of extension of the FIF in the future and makes possible application not only to Lab color space but also to sYCC color space.

Thus, in accordance with the present invention as described above, JPEG-encoded information can be received and the image thereof printed on printing paper of a specific type.

Second Embodiment

A second embodiment of the present invention will now be described. The first embodiment of the invention described above is such that if encoded image information has been received, the form in which the received image information is printed is controlled in dependence upon whether or not a specific type of printing paper has been loaded. The invention corresponding to this embodiment is such that if encoded image information has been received, the form in which the received image information is printed is controlled in dependence upon whether the color-space information of the received image information matches a prescribed color space.

The structure of a facsimile apparatus serving as the image communication apparatus of the invention of this application corresponding to this embodiment is substantially the same as that shown in FIG. 1. However, the memory 18 need not have the paper-type memory 18a. Further, a control program for controlling receive processing that characterizes this embodiment has already been stored in the ROM 24 within the facsimile apparatus. Receive processing according to this control program will be described in detail with reference to the flowcharts of FIGS. 15 to 17.

Figure 15:
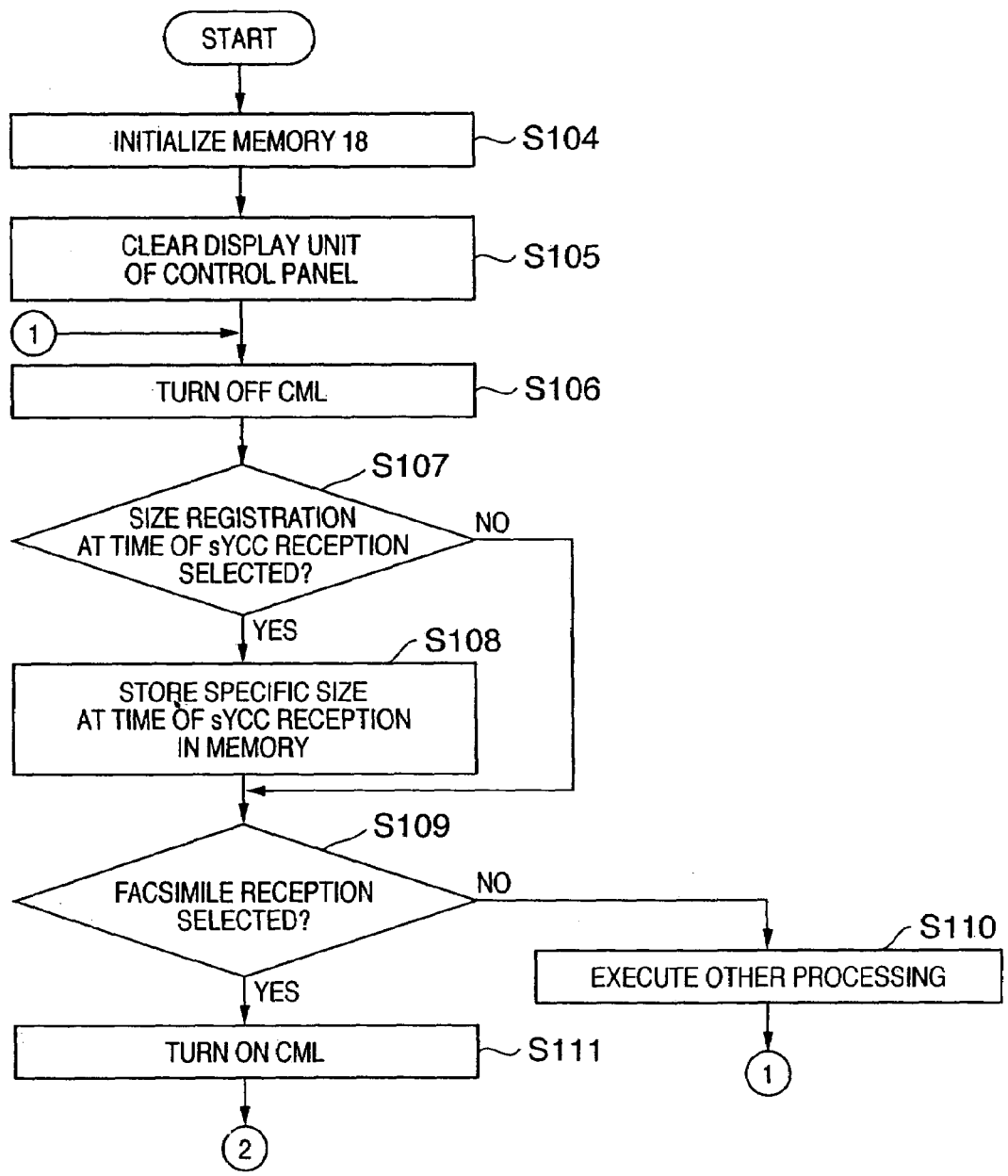
FIG. 15 is a flowchart illustrating receive processing according to a second embodiment of the present invention.
Figure 16:
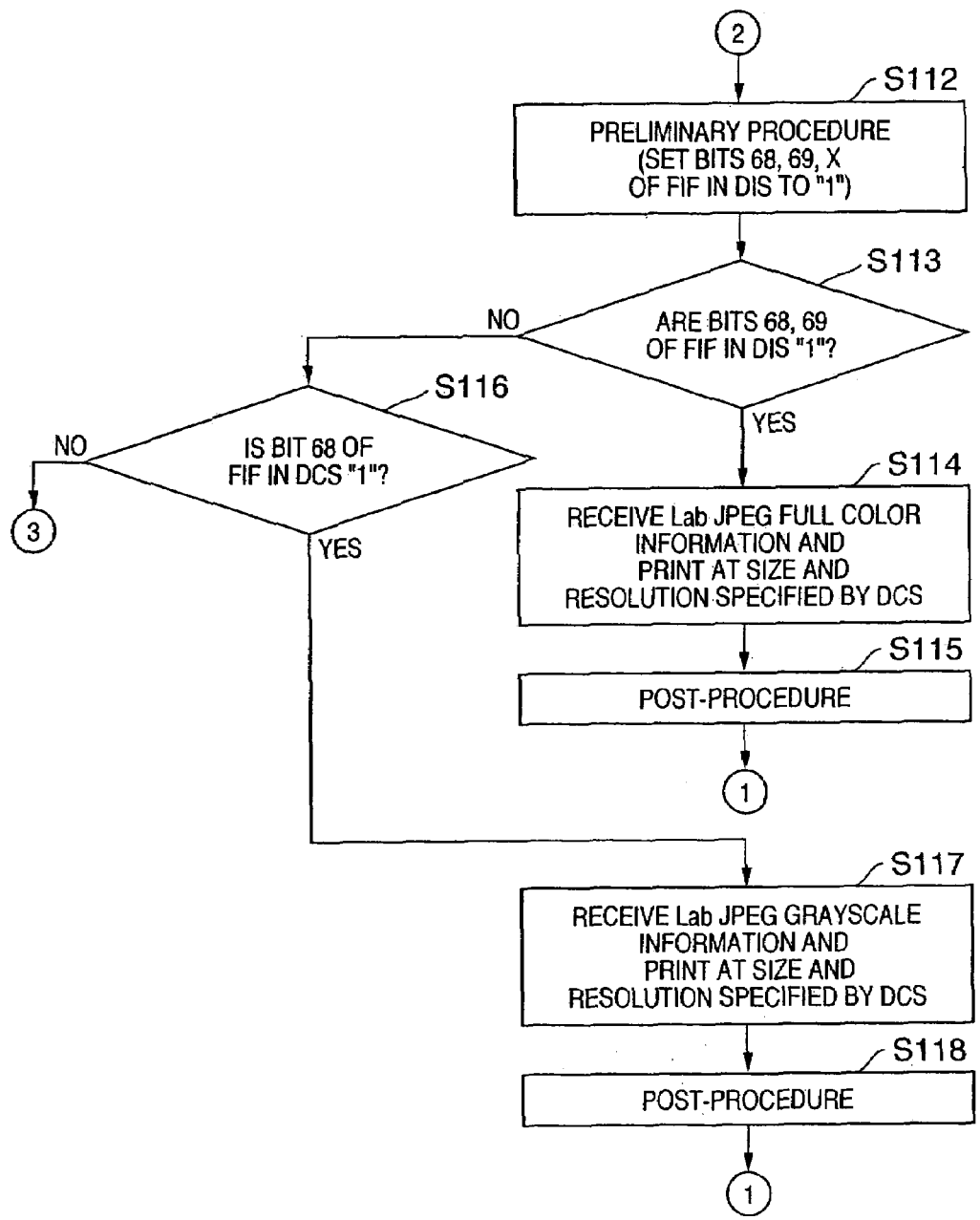
FIG. 16 is a flowchart illustrating receive processing according to the second embodiment of the present invention.

First, after the memory 18 is initialized via the bus 26 at step S104 in FIG. 15, the display unit of the control panel 20 is cleared via the bus 26 at step S105 and the CML of the NCU 2 is turned off, i.e., the telephone line 2a is connected to the side of the telephone set 4, via the bus 26 at step S106.

Based upon input information from the control panel 20, it is determined at step S107 whether registration of printing size at the time of printing has been selected at reception of JPEG-encoded data in sYCC color space. Control proceeds to step S108 if registration has been selected and to step S109 if registration has not been selected. At step S108 a specific size is stored in the memory 18 via the bus 26 as a printing size at reception of JPEG-encoded data in sYCC color space. The specific size is obtained as input information from the control panel 20 and, e.g., size A6 is registered.

Whether facsimile reception has been selected is determined at step S109. Control proceeds to step Sill if facsimile reception has been selected. If it has not been selected, control proceeds to step S110. Here other processing is executed, after which control returns to step S106.

The CML of NCU 2 is turned on via the bus 26 at step S111. That is, the telephone line 2a is connected to the side of the facsimile apparatus. A preliminary procedure for communication is performed at step S112 in FIG. 16. At this time the bits 68, 69, X of the FIF in the DIS are all set to logical "1", whereby the apparatus on the transmitting side is notified of the fact that JPEG-encoded full-color data in Lab color space and JPEG-encoded data in sYCC color space can be received.

It is determined at step S113 whether bits 68, 69 of the FIF in the DCS reported from the apparatus on the transmitting side by the preliminary procedure are both "1", i.e., whether transmission of JPEG-encoded full-color data in Lab color space has been specified. If both of these bits are logical "1", control proceeds to step S114. If at least one of these bits is not logical "1", control proceeds to step S116.

At step S114, the JPEG-encoded full-color data in Lab color space is received and the data is printed at the size and resolution specified by the aforesaid DCS, then a post-procedure is executed at step S115 and control returns to step S106.

It is determined at step S116 whether bit 68 of the FIF in the DCS is "1". If it is determined that this bit is "1", i.e., that transmission of JPEG-encoded grayscale data in Lab color space has been specified, then control proceeds to step S117, where the JPEG-encoded grayscale data in Lab color space is received and printed at a size and resolution specified by the aforesaid DCS. A post-procedure is then executed at step S118 and control returns to step S106.

Figure 17:
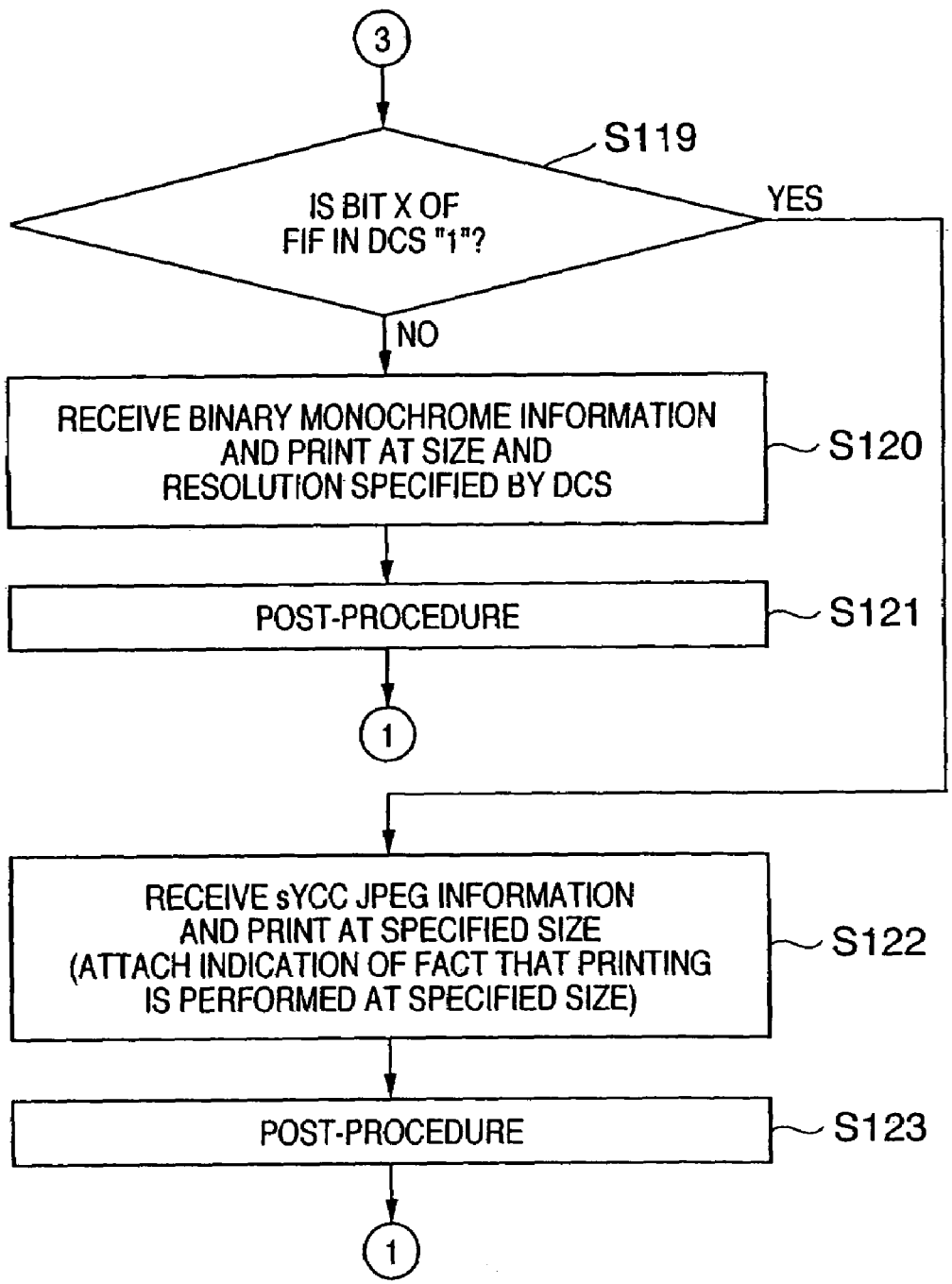
FIG. 17 is a flowchart illustrating receive processing according to the second embodiment of the present invention.

On the other hand, if it is found at step S16 that bit 68 of the FIF in the DCS is not "1", then control proceeds to step S119 in FIG. 17, where it is determined whether the X bit of the FIF in the DCS is "1", i.e., whether transmission of JPEG-encoded data in sYCC color space has been specified. If the bit is "1", control proceeds to step S122. If the bit is not "1", control proceeds to step S120 on the grounds that the apparatus is not capable of analyzing the received data. Here the data is received as monochrome binary information and processing for printing at the size and resolution specified by the DCS is executed, after which a post-procedure is executed at step S121 and control returns to step S106.

At step S122, the JPEG-encoded data in sYCC color space is received and the data is printed by the printing circuit 16 at a specific size that has been registered in the memory 18. For example, if the specific size is size A6, then the received data is scaled in such a manner that the image is printed on size A4 printing paper in a 4-in-1 format. At this time printing is performed upon attaching a message or specific mark or the like indicating that the specific size has been printed. A post-procedure is then executed at step S123 and control returns to step S106.

Thus, in accordance with this embodiment as described above, when JPEG full-color data in sYCC color space has been received, printing at a specific size set in advance by the user can be performed even in a case where the apparatus on the transmitting side has specified only the number of pixels and not the resolution and printing size.

Further, by clearly indicating the fact that printing will be performed at a specific size, this fact will readily be recognized by the user, thereby making the apparatus easier to operate.

Thus, in accordance with the present invention as described above, the image in a received image file can be printed by a printing method that conforms to the color space of the image.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. An image communication apparatus capable of communicating color image information, comprising:
    a first notifying unit for notifying the transmitting machine of whether this communication apparatus has a function for receiving JPEG code information in Lab color space;
    a second notifying unit for notifying a transmitting machine of whether this communication apparatus has a function for receiving full-color information in Lab color space;
    a third notifying unit for notifying the transmitting machine of whether this communication apparatus has a function for receiving JPEG code information in sYCC color space;
    a discriminating unit for discriminating type of printing paper that has been loaded in a printing unit; and
    a control unit which, if the JPEG code information is transmitted from the transmitting machine, is for controlling printing of the received JPEG code information by the printing unit in dependence upon whether said discriminating unit has discriminated that a specific type of printing paper has been loaded.

2. The apparatus according to claim 1, wherein if JPEG code information in sYCC color space is transmitted from the transmitting machine and said discriminating unit discriminates that a specific type of paper has been loaded, said control unit causes the JPEG code information to be printed by the printing unit.

3. The apparatus according to claim 1, wherein if JPEG code information in Lab color space is transmitted from the transmitting machine and said discriminating unit discriminates that a specific type of paper has been loaded, said control unit causes the JPEG code information to be printed by the printing unit.

4. The apparatus according to claim 1, wherein if JPEG code in Lab color space or JPEG code in sYCC color space is transmitted from the transmitting machine, said control unit exercises control so as to store the JPEG code information in a memory in a case where said discriminating unit discriminates that the specific type of printing paper has not been loaded.

5. The apparatus according to claim 1, wherein if JPEG code in Lab color space or JPEG code in sYCC color space is transmitted from the transmitting machine, said control unit exercises control so as to store the JPEG code information on a removable memory card in a case where said discriminating unit discriminates that the specific type of printing paper has not been loaded.

6. The apparatus according to claim 1, wherein the specific type of printing paper is photographic paper.

7. A method of controlling an image communication apparatus capable of communicating color image information, comprising:
    a step of notifying the transmitting machine of whether this communication apparatus has a function for receiving JPEG code information in Lab color space;
    a step of notifying a transmitting machine of whether this communication apparatus has a function for receiving full-color information in Lab color space;
    a step of notifying the transmitting machine of whether this communication apparatus has a function for receiving JPEG code information in sYCC color space;
    a discriminating step of discriminating type of printing paper that has been loaded in a printing unit; and
    a control step which, if the JPEG code information is transmitted from the transmitting machine, is a step of controlling printing of the received JPEG code information by the printing unit in dependence upon whether it has been discriminated at said discriminating step that a specific type of printing paper has been loaded.

8. The method according to claim 7, wherein if JPEG code information in sYCC color space is transmitted from the transmitting machine and it is discriminated that the specific type of paper has been loaded, the JPEG code information is caused to be printed by the printing unit at said control step.

9. The method according to claim 7, wherein if JPEG code information in Lab color space is transmitted from the transmitting machine and it is discriminated that the specific type of paper has been loaded, the JPEG code information is caused to be printed by the printing unit at said control step.

10. The method according to claim 7, wherein if JPEG code in Lab color space or JPEG code in sYCC color space is transmitted from the transmitting machine, control is exercised as said control step so as to store the JPEG code information in a memory in a case where it is discriminated that the specific type of printing paper has not been loaded.

11. The method according to claim 7, wherein if JPEG code in Lab color space or JPEG code in sYCC color space is transmitted from the transmitting machine, control is exercised as said control step so as to store the JPEG code information on a removable memory card in a case where it is discriminated that the specific type of printing paper has not been loaded.

12. The method according to claim 7, wherein the specific type of printing paper is photographic paper.

13. An image communication method for communicating color image information between a transmit-side apparatus and a receive-side apparatus, said method comprising the following steps executed at the receive-side apparatus:
    a color-space information receiving step of receiving color-space information of an image file transmitted from the transmit-side apparatus;
    a printing method decision step of deciding a method of printing the received image file based upon the color-space information;
    a printing step of printing the received image filed by the printing method decided at said printing method decision step; and
    a registration step of registering a printing method of an image file that is in a prescribed color space,
    wherein if the color-space information is indicative of the prescribed color space, the printing method of the received image file is decided at said printing method decision step to be the printing method that has been registered at said registration step.

14. The method according to claim 13, wherein the prescribed color space is sYCC color space.

15. The method according to claim 14, wherein the color-space information includes:
    information indicating whether JPEG-encoded data in Lab color space will be transmitted;
    information indicating whether full-color information in Lab color space will be transmitted; and
    information indicating whether JPEG-encoded data in sYCC color space will be transmitted.

16. The method according to claim 15, wherein the color-space information is reported by a FIY of a DCS from the transmit-side apparatus in a preliminary procedure.

17. The method according to claim 16, wherein the receive-side apparatus reports the following information to the transmit-side apparatus by the FIF of the DCS in the preliminary procedure:
    information indicating whether the receive-side apparatus has a function for receiving JPEG-encoded data in Lab color space;
    information indicating whether the receive-side apparatus has a function for receiving full-color information in Lab color space; and
    information indicating whether the receive-side apparatus has a function for receiving JPEG-encoded data in sYCC color space.

18. The method according to claim 13, wherein if the color-space information is not indicative of the prescribed color space, the printing method of the received image file is decided at said printing method decision step to be a printing method specified by the received file.

19. The method according to claim 13, wherein printing size is registered at said registration step.

20. The method according to claim 13, wherein if the received image file is registered by the printing method that has been registered at said registration step, information indicative of this fact is attached and printed.

* * * * *

UNITED STATES PATENT AND TRADEMARK OFFICE
CERTIFICATE OF CORRECTION

| | |
|---|---|
| PATENT NO. | : 7,226,142 B2 |
| APPLICATION NO. | : 10/760286 |
| DATED | : June 5, 2007 |
| INVENTOR(S) | : Takehiro Yoshida et al. |

It is certified that error appears in the above-identified patent and that said Letters Patent is hereby corrected as shown below:

COLUMN 3:

Line 38 "via" should read --via the--; and
Line 60 "bus" should be deleted.

COLUMN 5:

Line 25 "via" should read --via the--.

COLUMN 8:

Line 3 "photographic-" should read --photographic--.

COLUMN 9:

Line 66 "step Sill" should read --step S111--.

COLUMN 10:

Line 32 "step S16" should read --step S116--.

COLUMN 11:

Line 23 "scrip" should read --script--; and
Line 48 "user" should read --users--.

COLUMN 13:

Line 43 "filed" should read --file--.

UNITED STATES PATENT AND TRADEMARK OFFICE
CERTIFICATE OF CORRECTION

PATENT NO. : 7,226,142 B2
APPLICATION NO. : 10/760286
DATED : June 5, 2007
INVENTOR(S) : Takehiro Yoshida et al.

It is certified that error appears in the above-identified patent and that said Letters Patent is hereby corrected as shown below:

COLUMN 14:

Line 18 "FIY" should read --FIF--.

Signed and Sealed this

Seventh Day of October, 2008

JON W. DUDAS
*Director of the United States Patent and Trademark Office*